Feb. 24, 1953  H. M. BROWN  2,629,254
TENSILE STRENGTH TESTER
Filed June 27, 1950  2 SHEETS—SHEET 1

INVENTOR
HUGH M. BROWN
BY Ralph B. Stewart
ATTORNEY

Feb. 24, 1953   H. M. BROWN   2,629,254
TENSILE STRENGTH TESTER
Filed June 27, 1950   2 SHEETS—SHEET 2

INVENTOR
HUGH M. BROWN
BY Ralph B. Stewart
ATTORNEY

Patented Feb. 24, 1953

2,629,254

UNITED STATES PATENT OFFICE 2,629,254

TENSILE STRENGTH TESTER

Hugh M. Brown, Clemson, S. C., assignor to Clemson Agricultural College of South Carolina, Clemson, S. C., a corporation of South Carolina Application June 27, 1950, Serial No. 170,666

15 Claims. (Cl. 73—90)

This invention relates to testing apparatus for ascertaining the tensile strength of various materials, including particularly threads, yarns and other textile materials.

In prior apparatus for this purpose, a tension exerted on a test specimen of material has moved a weight or other resistance applying element in proportion to the amount of tension exerted on the test piece, and this in turn has actuated an indicator disposed to show the amount of tension required to break the specimen. Obviously with such an arrangement, the indicator is subject to errors arising from the inertia of the moving parts and from friction between the parts.

With the foregoing in mind, it is a primary object of the present invention to provide tensile strength testing apparatus involving a novel construction and operational principle making possible the elimination of errors due to inertia of moving parts or to friction therebetween.

In accordance with the invention, the test specimen is secured between a pair of clamps carried, respectively, by a pendulum and a swingable support or arm from which the pendulum is suspended, to prevent relative movement between the supporting arm and the pendulum during swinging movement of the arm. With this arrangement the test specimen is made to support a component of the weight of the pendulum and the attached parts, the component varying between zero and a maximum in accordance with the angular position of the swingable arm, without relative movement between the arm and pendulum, and such component is unaffected by the force employed in varying the angular position of the supporting arm.

It is a further object of the invention to provide means for varying the angular position of the supporting arm at such a rate as to produce a constant rate of increase in the tension exerted on the test specimen to further reduce the possibility of error in ascertaining the true force required to break the specimen.

A still further object is to provide means for automatically and accurately recording the amount of force required to break a given test specimen.

In this application I show and describe only the preferred embodiment of the invention and one modification thereof, simply by way of illustration. However, I recognize that the invention is capable of other and different embodiments and that the several details thereof may be altered in various ways, all without departing from the invention.

Figure 2:
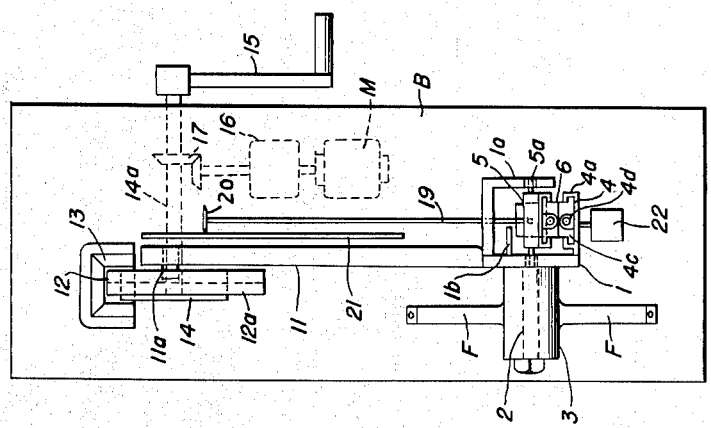
Figure 2 is a plan view of Figure 1.
Figure 1:
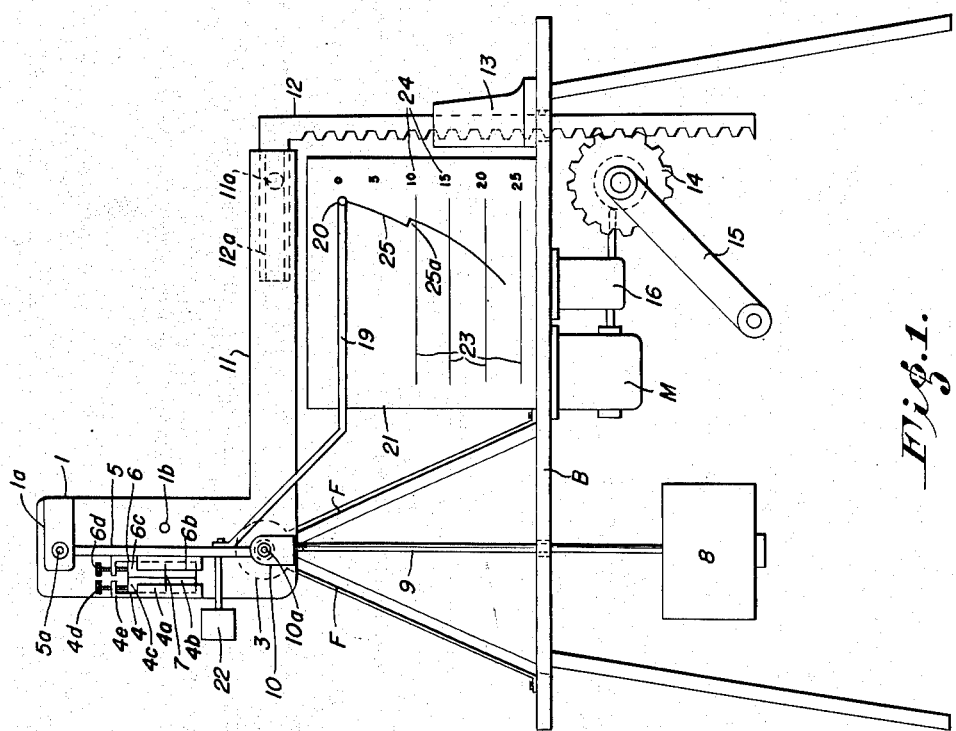
Figure 1 represents a front elevation of the preferred embodiment of the invention.

Referring now in detail to the accompanying drawings; and first considering the embodiment of the invention illustrated in Figures 1 and 2, the reference character B designates any suitable supporting base such as a flat topped table.

A rigid arm 1 is mounted on said base in any suitable manner for swinging movement about a fixed horizontal axis. In the present embodiment this is accomplished by providing the lower end portion of the arm with a rigid horizontal stub shaft or axle 2 (Fig. 2) which is rotatably received in a bearing 3 supported above the top of table B by the angle iron frame F.

Swingably supported by the arm 1 for movement about a horizontal axis 5a, spaced from and parallel to the axis 2, is a depending rigid bar or pendulum 5, of a length not substantially exceeding the distance between the axes 2 and 5a.

In order thus to support said pendulum 5 in the preferred embodiment, a bracket portion 1a carried by the arm 1 near its upper end is disposed in spaced parallel relation to the arm, as in Figure 2, and the upper end of pendulum 5 is pivotally connected between the arm 1 and plate 1a by a pivot pin defining the axis 5a.

In the zero position of the device, prior to its actuation, the supporting arm 1 is positioned as shown in Figure 1, with the axis 5a directly above the axis 2 and the bar or pendulum 5 depending vertically from the axis of pivot 5a.

Any suitable clamping means may be employed for fixedly securing a test specimen horizontally between the arm 1 and the pendulum 5, at a predetermined distance from the movable axis 5a.

For example a clamping device 4 is carried by the main element 1 to one side of the pendulum 5, and is arranged to clamp or otherwise fixedly engage a horizontally extending test specimen 7, such as a length of thread, yarn or the like.

The device 4 shown by way of example comprises a channel vertical guide 4a fixed to the arm 1, a fixed jaw 4b mounted in the guide and a jaw 4c movable vertically in the guide toward and away from the fixed jaw. A manually rotatable screw 4d threaded through a plate 4e fixed to the arm 1 may be turned to force the jaw 4c toward jaw 4b.

A similar clamp 6, having a stationary jaw 6b and movable jaw 6c controlled by an actuating screw 6d is carried by the pendulum or bar 5 in relatively horizontally opposed relation to the clamp 4 so that a test specimen 7, in the zero position of arm 1, may be held horizontally between the clamps 4 and 6.

A stop 1b projects from the arm 1 on the side of pendulum 5 opposite the clamp 4. Such a stop is spaced somewhat from the pendulum 5 to permit a limited swinging movement of the pendulum about its axis 5a upon breaking of the specimen 7, but to prevent any unnecessary swinging beyond that required to clearly indicate the breaking point of the specimen, as hereinafter described in more detail.

With such arrangement, as the arm 1 is swung in a clockwise direction away from its zero or vertical position, it will be apparent that the depending bar or pendulum 5, though urged by gravity toward a vertical position, will be held stationary relative to the arm 1 by the test specimen 7 which connects the arm 1 and pendulum 5 through the clamps 4 and 6.

Thus the test specimen 7 will be caused to support a component of the weight of the pendulum 5 and any parts carried thereby until such component becomes equal to the tensile strength of the specimen, and then the specimen breaks.

In order to make possible the exertion of a sufficient amount of tension to break test specimens of considerable strength, a weight 8 is suspended from the pendulum bar 5 in a manner so that the weight will remain stationary during tilting or angular movement of the pendulum, to thereby avoid the imposition on the specimen 7 of inertia forces such as would arise were the weight 8 to swing with the pendulum.

To this end, the weight 8 is suspended from a rod 9 depending through an opening in the top of table B. The upper end of this rod is provided with a clevis 10 which receives the lower end of pendulum 5 and is pivotally connected to the arm 1 by a pin 10a positioned to be in alignment and have its axis coincident with the pivotal axis 2 of the arm 1, in the zero position of the latter. During the swinging or tilting movement of arm 1 axis 10a remains substantially coincident with axis 2 until the time the test specimen is broken.

By the application of basic trigonometric principles, it will be apparent that the amount of tension exerted on the test specimen 7 will increase in proportion to the sine of the angle through which the arm 1 is rotated from its vertical or zero position.

Since it is an important object of the invention to obtain a uniform rate of increase in the tension exerted on the test specimen 7, in order to further avoid the imposition of any inertia forces on the test specimen, means is provided for tilting the arm 1 in a manner to produce a uniform rate of change in the sine of the angle through which the supporting arm moves.

Such means comprises an operating member moving at a constant speed in a linear direction at right angles to a control arm extending radially from the axis of shaft 2 when the arm 1 is in its zero position, and means connecting said operating member to said control arm at a point spaced a fixed distance from the axis of shaft 2 to impart to said point a component of movement parallel with the direction of movement of said operating member and coextensive with the linear movement of the operating member.

In the construction shown in Figures 1 and 2 I accomplish this by providing the arm 1 with a control arm 11 rigid therewith and projecting horizontally therefrom in the zero position of arm 1.

An operating member or sine bar 12, which may be in the form of a rack bar, is mounted in a guide 13 on the table B for linear vertical movement through an opening in the table top.

Carried by the operating member 12 is a horizontally slotted or channeled cross head or driver portion 12a which slidably receives a pin or follower 11a fixedly carried by the control arm 11. Such a connection between the operating member 12 and arm 11 will cause the free end of the control arm (coincident with the pin or follower 11a) to move vertically with the operating member 12, while permitting it a horizontal component of motion such as is required in order that the arm 11 may follow an arcuate path of movement about the axis 2.

Inasmuch as the distance of the follower 11a from its axis 2 is fixed, the sine of the angle through which the arm 1 has swung at any given instant may obviously be measured by the linear distance through which the operating member 12 has moved from its zero position, it being apparent that such distance will equal the length of the side of a right triangle opposite such angle of movement.

Any suitable mechanism may be provided for uniformly moving the operating member 12 to produce a uniform increase in the tension exerted on the specimen 7.

Such mechanism may comprise a pinion 14 in mesh with a rack bar or member 12, the pinion being rotated at a constant speed by suitable means such as a hand crank 15 carried by the pinion shaft 14a or by a constant speed electric motor M mounted beneath the table B and having a driving connection with pinion shaft 14a through a speed-reducing gear box 16 and bevel gears 17.

In order to record the exact point at which the specimen 7 breaks, and the amount of tension required to cause a break, a scriber arm 19 carried by and projecting laterally from the pendulum 5 carries a scribing device 20, such as a pen or pencil, adjacent its free end for cooperation with a replaceable normally stationary chart 21 which is supported at a predetermined height on the table B, with its face in a plane coincident with the path of movement of the point of the scribing instrument or device 20.

The weight of the scriber arm 19 is counterbalanced by a counterweight 22 carried by the pendulum 5, whereby the pendulum may normally tend to assume a true vertical position.

The chart 21 preferably will be calibrated with graduated horizontal lines 23 which may have indicia 24 applied thereto to indicate the amount of tension applied to the test specimen at the point where the arcuate line or path traced on the chart by the instrument 20 intersects the graduated lines.

Inasmuch as the tension increases uniformly with the vertical movement of the operating member 12, it will be seen that relatively equally spaced graduations 23 may be employed to indicate equal amounts of increase in the tension. This will of course facilitate the accurate production of charts as well as the interpolation of values lying between the various graduations lines.

In using the apparatus shown in Figures 1 and 2, with the arm 1 in its zero position a length or specimen 7 of the material to be tested is secured horizontally between the two clamps 4 and 6, and the motor M is then started in usual manner to produce swinging movement of the arm 1 in a clockwise direction. This places a constantly increasing tension on the specimen 7 which normally will hold the pendulum 5 in fixed relation to the arm 1 without stretching appreciably, until such a degree of tension is attained as to break the specimen. As the arm 1 tilts from its zero position the scriber arm 19 also swings about the axis 2 and the scriber 20 traces an arcuate path 25 on the chart 21. Breaking of the specimen 7, with consequent swinging of the pendulum 5 against the stop 1b will cause the scribing instrument 20 to move to a new radius, this being indicated by a jog or break 25a in the trace line 25 on the chart. The location of jog or break in the trace line relative to the various graduations 23 on the chart will indicate the amount of tension placed on said specimen at the time of the break, and thus will accurately indicate its tensile strength.

The arm 1 may then be reset to zero position and the broken specimen replaced by a new specimen to be tested in similar manner. Obviously a slight horizontal movement or displacement of the chart 21 between tests will permit the same chart to be used for a number of different tests.

Figure 3:
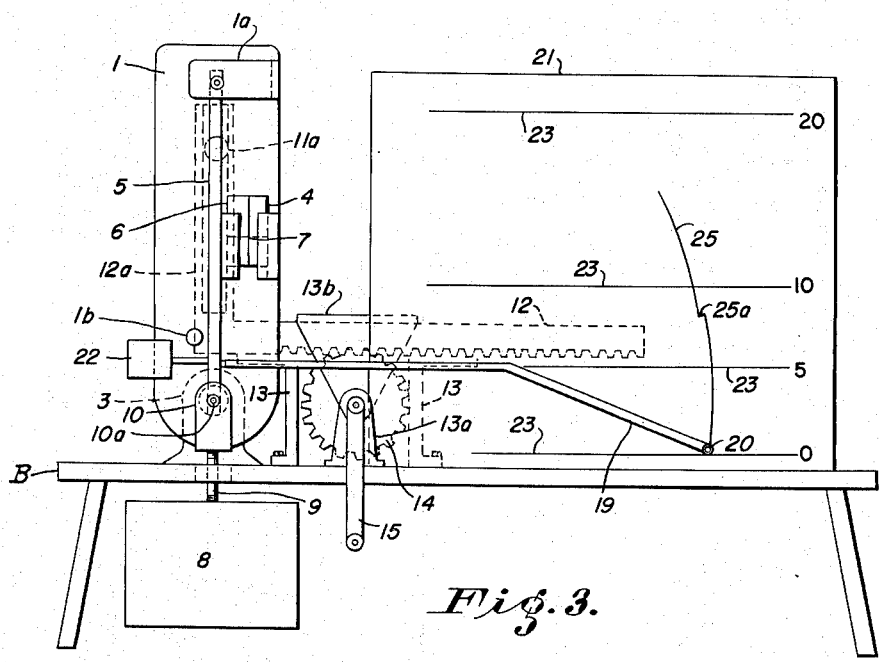
Figure 3 is a front elevation of a modified form of the invention.
Figure 4:
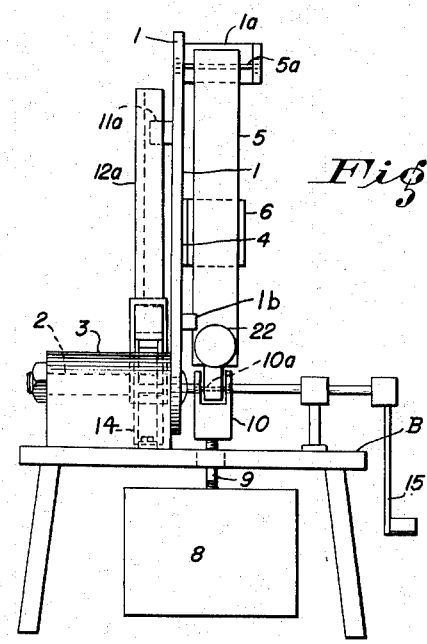
Figure 4 is an end elevation of the modified form as viewed from the left in Figure 3.
Figure 5:
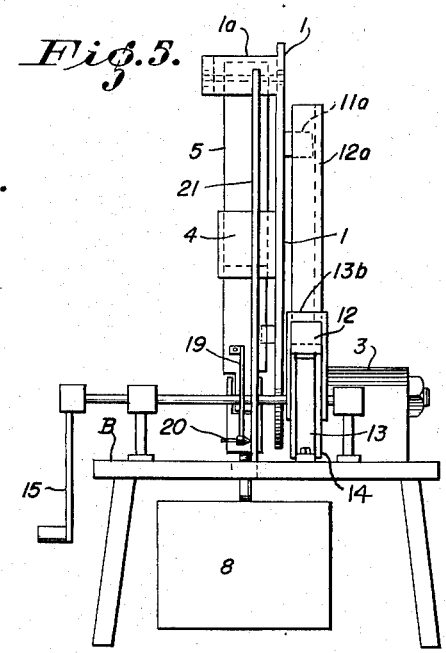
Figure 5 is an end elevation as viewed from the right in Figure 3.

In the modified form of the invention shown in Figures 3, 4, and 5, the construction and operation is basically similar to that of the preferred embodiment, except that the main supporting arm 1 is swingable in a counter-clockwise direction to increase the tension on the test specimen 7 and the operating member 12 moves horizontally; the cross-head 12a being arranged vertically, and the pin 11a being mounted on arm 1 instead of on a separate arm. Thus, the control arm in this arrangement, extending from the axis of shaft 2 to the pin 11a, is embodied in the main supporting arm 1. Another difference between Figure 3 and Figure 1 is that clamps 4 and 6 are arranged on the opposite side of pendulum 5, and the same is true for stop pin 1b. The details of the clamps 4 and 6 have not been shown in Figures 3 to 5 but they are the same as in Figures 1 and 2. It will also be noted that with the rearrangement of the operating member 12, the bearing 3 for the stub shaft 2 of arm 1 is mounted at a lower elevation on table B.

The horizontally movable rack bar or operating member 12 of this embodiment is slidably mounted for horizontal movement in a suitable guide 13 supported on the base B. A bracket 13a mounted on the base rotatably supports the drive pinion 14 in mesh with the rack bar 12 and also functions as a support for a yoke 13b which slidably receives the rack bar 12 and prevents upward displacement thereof.

Obviously the drive pinion 14 may be rotated at a constant speed by suitable means as in the preferred embodiment.

The scriber arm 19 is carried by the pendulum and supports a scribing instrument 20 for cooperation with a chart 21 as in the preferred embodiment, except that the chart graduations in this case will increase in value in an upward direction, rather than downwardly as in the preferred embodiment, it being apparent that counter-clockwise movement of the arm 1 to increase the tension on the test specimen 7 will cause an upward swinging movement of the scriber arm 19 from its zero position.

In both forms of my invention it is not essential that the weight 8 be pivotally connected to the pendulum 5, but it may be mounted directly on the pendulum so that the center of gravity of the weight is located on the horizontal axis of shaft 2. With either method of attachment of the weight, it serves to apply a constant downwardly directed force upon the pendulum at the center of rotation of the pendulum about the axis of shaft 2.

In each form of the invention it will be readily apparent that I have provided means for increasing the tension on the test specimen at a uniform rate. Moreover, since the pendulum and any weight supported thereby will not move appreciably before breakage of the test specimen, it will be seen that the results of tests conducted on the apparatus of my invention will be free from error due to inertia of the weight which provides the breaking tension.

Further, the moving parts are so arranged and related that any friction arising therebetween does not add to or subtract from the tension which is applied to the specimen, hence freedom from errors due to friction is attained. Any friction resulting from the engagement between the scribing instrument and its cooperating chart will be negligible.

Thus, substantially complete freedom will be obtained from any errors due to friction, inertia, or to vibration such as may arise in machines employing rolling weights, etc., and the results of each test are automatically and accurately recorded.

I claim:

1. A tensile strength tester comprising a base, a rigid arm mounted on said base for swinging movement about a fixed horizontal axis, a rigid pendulum swingably suspended from said arm for movement about a movable axis spaced from and parallel to said fixed axis, said arm being swingable to and from a zero position wherein said movable axis is positioned directly above said fixed axis, a weight pivotally connected to said pendulum on a horizontal axis which in the zero position of said arm is coincident with said fixed axis, means carried by said arm and said pendulum respectively for fixedly securing a test specimen horizontally therebetween, a scriber arm carried by said pendulum, a chart mounted on said base in a plane parallel to the movement of said scriber arm, and a scribing instrument carried by said scriber arm in operative engagement with said chart, said chart being calibrated in terms of the tension applied to said specimen in various positions of said scribing instrument.

2. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween; means for swinging said arm away from its zero position at such a varying rotational speed as to produce a uniform rate of increase in the tension exerted on said specimen, a scriber arm carried by and projecting laterally from said pendulum, a weight carried by said pendulum for counterbalancing the weight of said scriber arm, a chart mounted at a predetermined height on said base in a plane parallel to the movement of said scriber arm, and a scribing instrument carried by said scriber arm in operative engagement with said chart, said chart being calibrated in terms of the tension applied to said test specimen in various angular positions of said first mentioned arm.

3. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween, means for swinging said arm away from its zero position at such a varying rotational speed as to produce a uniform rate of increase in the tension exerted on said specimen, a scriber arm carried by said pendulum, a chart mounted on said base in a plane parallel to the movement of said arm, and a scribing implement carried by said scriber arm in operative engagement with said chart.

4. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween, and means for swinging said arm away from its zero position at such a varying rotational speed as to produce a uniform rate of increase in the tension exerted on said specimen.

5. A tensile strength tester comprising a base, a rigid arm mounted on said base for swinging movement about a fixed horizontal axis, a rigid pendulum swingably suspended from said arm for movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween, a scriber arm carried by said pendulum and extending laterally therefrom, a chart mounted on said base in a plane parallel to the movement of said scriber arm, and a scribing instrument carried by said scriber arm in operative engagement with said chart.

6. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, and means carried by said arm and said pendulum respectively for fixedly securing a test specimen horizontally therebetween.

7. A tensile strength tester as set forth in claim 6 including a weight pivotally suspended from said pendulum on a horizontal axis which in the zero position of said arm is coincident with said fixed axis.

8. A tester according to claim 6 and including means for applying to said pendulum a constant force directed vertically downward and applied to said pendulum at a point which is coincident with said fixed axis when the pendulum is in vertical position.

9. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween, a rack bar mounted on said base for horizontal linear movement, a follower fixed to said arm in vertical alignment with said fixed axis in the zero position of said arm, said rack bar having a vertically channeled driver portion slidably receiving said follower to impart thereto a component of horizontal motion coextensive with that of said rack bar.

10. A tensile strength tester cmprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween, an operating member guided on said base for linear movement along a given path, and means connecting said operating member to said arm for rotation of said arm from its zero position through an angle having a sine value which varies in proportion to the extent of linear movement of said operating member from a position corresponding to said zero position.

11. A tensile strength tester comprising a base, a rigid supporting arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, a weight pivotally connected to said pendulum on a horizontal axis which in the zero position of said arm is coincident with said fixed axis, means carried by said arm and said pendulum respectively for fixedly securing a test specimen horizontally therebetween, an operating member guided on said base for linear movement along a given path, a control arm rigidly movable with said supporting arm and extending radially from the axis of said supporting arm and at right angles to said path when said supporting arm is in zero position, a follower rigidly connected with said control arm and located at a fixed distance from the pivotal axis of said control arm, said operating member having a driver portion extending at right angles therefrom and being parallel to said control arm in the zero position of said supporting arm, and means connecting said follower for sliding movement along said driver portion and for imparting to said follower a component of movement parallel with said path and equal to the movement of the operating member.

12. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, means carried by said arm and said pendulum respectively for fixedly securing a test specimen horizontally therebetween, a rack bar mounted on said base for linear vertical movement, an arm extension projecting horizontally from said arm in the zero position of the latter, a follower fixed to said arm extension in horizontal alignment with said fixed axis in the zero position of said arm, said rack bar having a horizontally channeled driver portion slidably receiving said follower to impart thereto a component of vertical motion coextensive with that of said rack bar.

13. A tensile strength tester comprising a base, a rigid arm mounted on said base for swinging movement about a fixed horizontal axis, a rigid pendulum suspended from said arm for swinging movement about a movable axis spaced from and parallel to said fixed axis, said arm being swingable to and from a zero position wherein said movable axis is directly above said fixed axis, a weight pivotally connected to said pendulum on a horizontal axis which in the zero position of said arm is coincident with said fixed axis, means carried by said arm and said pendulum respectively for fixedly securing a test specimen horizontally therebetween, means for swinging said arm away from its zero position at such a varying rotational speed as to produce a uniform rate of increase in the tension exerted on said specimen, said means comprising a rack bar guided on said base for linear movement along a given path, means connecting said rack bar with said arm for rotation of said arm from its zero position through an angle having a sine value which varies in proportion to the extent of linear movement of said bar from a position corresponding to said zero position, a pinion rotatably supported on said base in mesh with said rack bar, and means for rotating said pinion at a constant speed.

14. A tensile strength tester comprising a base, a rigid arm mounted on said base for swinging movement about a fixed horizontal axis, a rigid pendulum swingably suspended from said arm for movement about a movable axis spaced from and parallel to said fixed axis, said arm being swingable to and from a zero position wherein said movable axis is positioned vertically above said fixed axis, a weight pivotally connected to said pendulum on an axis which in the zero position of said arm is coincident with the said fixed axis, a fixed clamp carried by said arm and positioned to one side of said pendulum, and a movable clamp carried by said pendulum, said clamps being in horizontally opposed relation to fixedly secure a test specimen horizontally therebetween, means for swinging said arm about its fixed axis at such a varying rotational speed as to exert a uniformly increasing tension on said specimen, said means comprising an operating member guided for linear movement along a given path, and means connecting said operating member to said arm for rotation of said arm from its zero position through an angle having a sine value which varies in proportion to the extent of linear movement of said operating member from a position corresponding to said zero position, a scriber arm carried by said pendulum, a chart mounted on said base in a plane parallel to the movement of said scriber arm, and a scribing instrument carried by said scriber arm in engagement with said chart.

15. A tensile strength tester comprising a base, a rigid arm mounted on said base for swinging movement about a fixed horizontal axis, a rigid pendulum swingably suspended from said arm for movement about a movable axis spaced from and parallel to said fixed axis, said arm being swingable to and from a zero position wherein said movable axis is directly above said fixed axis, a weight pivotally connected to said pendulum on a horizontal axis which in the zero position of said arm is coincident with said fixed axis, means carried by said arm and said pendulum respectively for fixedly securing a test specimen horizontally therebetween, means for swinging said arm away from its zero position at such a varying rotational speed as to produce a uniform rate of increase in the tension exerted on said specimen, said means comprising a rack bar guided on said base for linear movement along a given path, a control arm rigidly movable with said supporting arm and extending radially from the axis of said supporting arm and at right angles to said path when said supporting arm is in zero position, a follower rigidly connected to said control arm and located at a fixed distance from the pivotal axis of said control arm, said rack bar having a laterally extending channeled driver portion slidably receiving said follower to impart to the follower a component of motion coextensive with that of the rack bar, a pinion rotatably supported on said base in mesh with said rack bar, means for rotating said pinion at a constant speed, a scriber arm carried by said pendulum, a chart mounted on said base in a plane parallel to the movement of said scriber arm, and a scribing instrument carried by said scriber arm in operative engagement with said chart, said chart being calibrated in terms of the tension applied to said test specimen in various positions of said instrument.

HUGH M. BROWN.

REFERENCES CITED

The following references are of record in the file of this patent:

UNITED STATES PATENTS

| Number | Name | Date |
|---|---|---|
| 404,200 | Jump | May 28, 1889 |
| 1,327,393 | Jury | Jan. 6, 1920 |
| 1,884,388 | Thwing | Oct. 25, 1932 |
| 2,205,579 | Scott | June 25, 1940 |
| 2,537,170 | Steiding | Jan. 9, 1951 |